United States Patent
Inglis et al.

(10) Patent No.: US 9,657,550 B2
(45) Date of Patent: May 23, 2017

(54) PRESSURE EQUALIZATION FOR DUAL SEAT BALL VALVE

(71) Applicant: Halliburton Energy Services, Inc., Houston, TX (US)

(72) Inventors: Peter D. W. Inglis, Scotland (GB); Ewan Ogilvie Robb, Scotland (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/765,654

(22) PCT Filed: Feb. 25, 2013

(86) PCT No.: PCT/US2013/027666
§ 371 (c)(1),
(2) Date: Aug. 4, 2015

(87) PCT Pub. No.: WO2014/130052
PCT Pub. Date: Aug. 28, 2014

(65) Prior Publication Data
US 2016/0003004 A1    Jan. 7, 2016

(51) Int. Cl.
*E21B 34/14* (2006.01)
*F16K 5/06* (2006.01)
(Continued)

(52) U.S. Cl.
CPC .............. *E21B 34/14* (2013.01); *E21B 34/06* (2013.01); *E21B 34/101* (2013.01); *F16K 5/0605* (2013.01); *E21B 2034/002* (2013.01)

(58) Field of Classification Search
CPC ..................... E21B 34/14101; E21B 2034/002
See application file for complete search history.

(56) References Cited

U.S. PATENT DOCUMENTS

| 3,036,600 A * | 5/1962 | Vickery | F16K 39/06 137/625.12 |
| 3,868,995 A * | 3/1975 | Crowe | E21B 34/101 137/629 |

(Continued)

FOREIGN PATENT DOCUMENTS

EP    1860276 A1    11/2007

OTHER PUBLICATIONS

International Preliminary Report on Patentability issued in related PCT Application No. PCT/US2013/027666, mailed Sep. 3, 2015 (7 pages).

(Continued)

*Primary Examiner* — Matthew R Buck
*Assistant Examiner* — Aaron Lembo
(74) *Attorney, Agent, or Firm* — Scott Richardson; Baker Botts L.L.P.

(57) ABSTRACT

A ball valve comprising a housing comprising a fluid passage, a first seat surface, a second seat surface, and a ball rotatably movable within the housing between an open position allowing flow through the fluid passage of the housing and a closed position preventing flow through the fluid passage of the housing, wherein the ball contacts the first seat surface and the second seat surface to form one or more seals within the ball valve, wherein the ball comprises a fluid passage and a fluid path, wherein the fluid path fluidly connects a space between the first seat surface and the second seat surface with the fluid passage of the housing, with the fluid passage of the ball, or both, when the ball is in the open position.

20 Claims, 5 Drawing Sheets

(51) Int. Cl.
*E21B 34/10* (2006.01)
*E21B 34/06* (2006.01)
*E21B 34/00* (2006.01)

(56) References Cited

U.S. PATENT DOCUMENTS

| | | | | |
|---|---|---|---|---|
| 4,125,165 A * | 11/1978 | Helmus | ............... | E21B 34/103 166/264 |
| 4,177,833 A * | 12/1979 | Morrison | ............. | F16K 3/0227 137/625.12 |
| 4,289,165 A * | 9/1981 | Fredd | ..................... | E21B 34/14 137/625.32 |
| 4,582,140 A | 4/1986 | Barrington | | |
| 4,619,325 A * | 10/1986 | Zunkel | ................. | E21B 34/103 166/319 |
| 4,657,083 A * | 4/1987 | Ringgenberg | ........ | E21B 34/103 166/323 |
| 4,899,980 A | 2/1990 | Kemp | | |
| 5,052,657 A * | 10/1991 | Winship | .................. | F16K 39/06 166/324 |
| 5,305,986 A * | 4/1994 | Hunt | ..................... | F16K 5/0605 251/174 |
| 5,346,178 A * | 9/1994 | Baker | .................. | F16K 5/0678 137/860 |
| 5,484,022 A * | 1/1996 | Coutts | ................... | E21B 34/102 166/324 |
| 6,152,229 A * | 11/2000 | Jennings | ................. | E21B 29/04 137/613 |
| 7,118,549 B2 * | 10/2006 | Chan | ................... | A61M 27/006 251/65 |
| 7,758,016 B2 | 7/2010 | Scott et al. | | |
| 7,963,339 B2 * | 6/2011 | Cowie | .................... | E21B 34/10 166/332.3 |
| 8,403,063 B2 * | 3/2013 | Inglis | ..................... | E21B 34/14 166/316 |
| 8,534,360 B2 * | 9/2013 | Kalb | ....................... | E21B 34/06 166/332.3 |
| 8,607,882 B2 * | 12/2013 | Kalb | ....................... | E21B 34/06 166/332.3 |
| 8,695,622 B2 * | 4/2014 | Inglis | .................. | F16K 5/0605 137/155 |
| 9,328,584 B2 * | 5/2016 | Kalb | ....................... | E21B 34/06 |
| 9,377,120 B2 * | 6/2016 | Thomas | ............... | F16K 27/067 |
| 2009/0050332 A1 * | 2/2009 | Cowie | .................... | E21B 34/10 166/373 |
| 2012/0018172 A1 * | 1/2012 | Javed | ..................... | E21B 34/14 166/382 |
| 2012/0260991 A1 | 10/2012 | Inglis et al. | | |
| 2012/0273223 A1 | 11/2012 | Kalb et al. | | |
| 2013/0269951 A1 * | 10/2013 | Tahoun | .................. | E21B 34/06 166/373 |
| 2015/0315869 A1 * | 11/2015 | Landry | .................. | E21B 33/04 166/86.1 |

OTHER PUBLICATIONS

International Search Report issued in related PCT Application No. PCT/US2013/027666 mailed Nov. 1, 2013, 3 pages.

* cited by examiner

PRESSURE EQUALIZATION FOR DUAL SEAT BALL VALVE

CROSS-REFERENCE TO RELATED APPLICATION

The present application is a U.S. National Stage Application of International Application No. PCT/US2013/027666 filed Feb. 25, 2013, which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations that contain hydrocarbons to allow recovery of the hydrocarbons. During the drilling and production of a hydrocarbon bearing formation, various procedures may be performed that involve temporarily isolating fluid flowing into or out of the formation through a wellbore tubular. Such procedures can include flow control operations, completion operations, and/or interventions. Various valves, including ball valves, may be used during these procedures to control the flow of fluid through the wellbore tubular. Ball valves generally include a ball seat for receiving a sealing ball. In traditional ball valves, the valve is closed by seating the ball on the ball seat to form a seal.

SUMMARY

Disclosed herein is a ball valve comprising a housing comprising a fluid passage, a first seat surface, a second seat surface, and a ball rotatably movable within the housing between an open position allowing flow through the fluid passage of the housing and a closed position preventing flow through the fluid passage of the housing, wherein the ball contacts the first seat surface and the second seat surface to form one or more seals within the ball valve, wherein the ball comprises a fluid passage and a fluid path, wherein the fluid path fluidly connects a space between the first seat surface and the second seat surface with the fluid passage of the housing, with the fluid passage of the ball, or both, when the ball is in the open position.

According to another aspect, disclosed herein is a ball valve comprising a housing comprising a fluid passage, a first seat surface, a second seat surface, and a ball rotatably movable within the housing between an open position allowing flow through the fluid passage of the housing and a closed position preventing flow through the fluid passage of the housing, wherein the ball contacts the first seat surface and the second seat surface to form one or more seals within the ball valve, wherein the ball comprises a fluid passage and a plurality of fluid paths, wherein each of the plurality of fluid paths fluidly connects a space between the first seat surface and the second seat surface with the fluid passage of the housing, with the fluid passage of the ball, or both, when the ball is in the open position.

According to another aspect, disclosed herein is a method comprising providing a ball valve that comprises a housing comprising a fluid passage, a first seat surface, a second seat surface, and a ball rotatably movable within the housing between an open position allowing flow through the fluid passage of the housing and closed position preventing flow through the fluid passage of the housing, wherein the ball contacts the first seat surface and the second seat surface to form one or more seals within the ball valve, wherein the ball comprises a fluid passage and a fluid path, wherein the fluid path fluidly connects a space between the first seat surface and the second seat surface with the fluid passage of the housing, with the fluid passage of the ball, or both, when the ball is in the open position; disposing the ball valve within a wellbore tubular string penetrating a subterranean formation; and activating the ball valve from an open position to a closed position or from a closed position to an open position to selectively allow or disallow fluid flow from the wellbore tubular string to the formation or vice-versa.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

The present description is directed to a ball valve for controlling the flow of a fluid, for example in a subterranean wellbore. A seal may be formed in a ball valve having a contact pressure in excess of the pressure being sealed against. Moreover, the contact pressure may not be in such excess so as to hinder a movement (e.g., actuation) of the ball valve in high pressure applications. The ball valve of the present disclosure may have two or more (e.g., a plurality of) seats with seat surfaces that are fixed with respect to each other, are movable relative to each other, or both. The use of two or more seats and seat surfaces may provide for redundancy in sealing surfaces, presenting an advantage over valves using a single seat surface. The use of one or more of the embodiments of fluid paths disclosed herein may provide an advantage of the ability for the ball valve of the present disclosure to rotatably move (e.g., actuate) in high pressure applications which would otherwise hinder movement of the ball of the ball valve due to the high sealing force of the seats with the ball.

Figure 1:
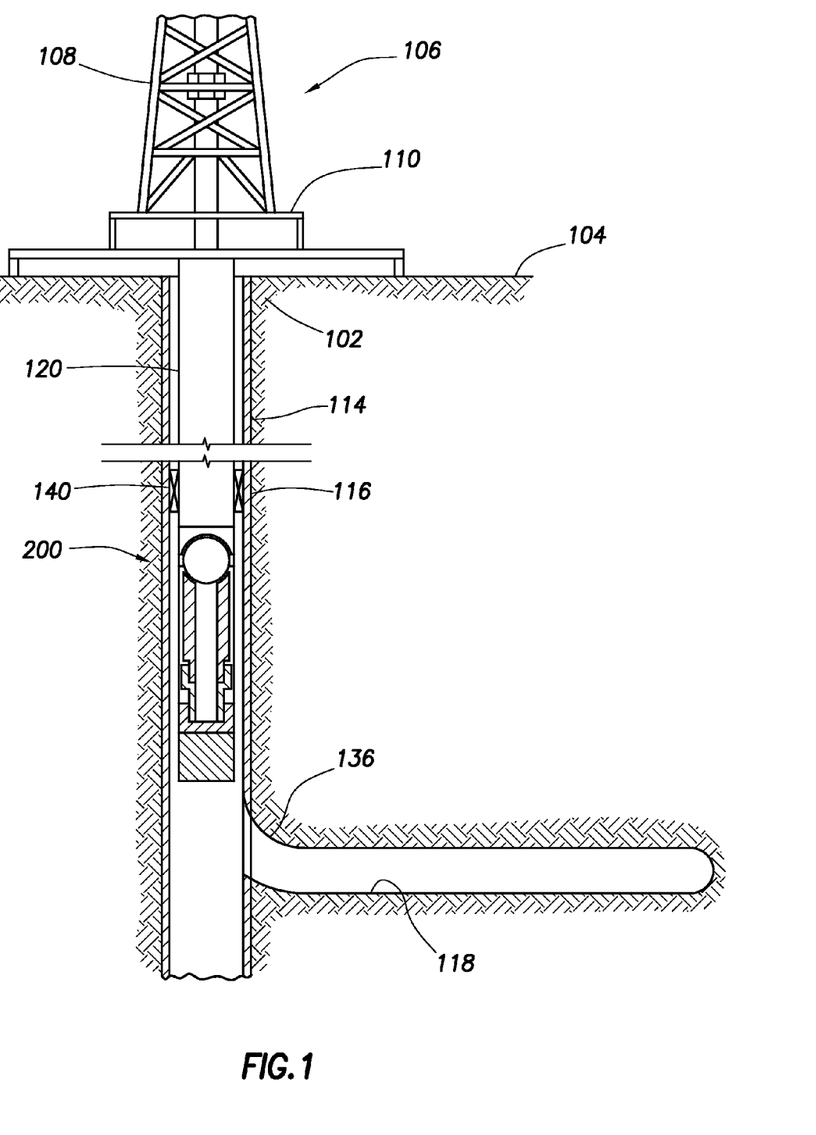
FIG. 1 is a schematic view of an embodiment of a subterranean formation and wellbore operating environment.

Referring to FIG. 1, an example of a wellbore operating environment in which a ball valve 200 may be used is shown. As depicted, the operating environment comprises a workover and/or drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, deviates from vertical relative to the earth's surface 104 over a deviated wellbore portion 136, and transitions to a horizontal wellbore portion 118. In alternative operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multi-lateral wellbore, and other types of wellbores for drilling and completing one or more production zones. Further the wellbore may be used for both producing wells and injection wells.

A wellbore tubular string 120 comprising a wellbore tubular and a ball valve 200 may be lowered into the subterranean formation 102 and penetrate same for a variety of workover or treatment procedures throughout the life of the wellbore. The embodiment shown in FIG. 1 illustrates the wellbore tubular string 120 in the form of a production tubing string comprising a packer 140 disposed in the wellbore 114. It should be understood that the wellbore tubular string 120 comprising the ball valve 200 is equally applicable to any type of wellbore tubular string being inserted into a wellbore as part of a procedure needing fluid isolation from above or below the ball valve, including as non-limiting examples drill pipe, casing, rod strings, and coiled tubing. Further, a means of isolating the interior of the wellbore tubular string 120 from the annular region between the wellbore tubular string 120 and the wellbore wall 114 may take various forms. For example, a zonal isolation device such as a packer (e.g., packer 140), may be used to isolate the interior of the wellbore tubular string 120 from the annular region to allow for the ball valve 200 to control the flow of a fluid through the wellbore tubular 120. While FIG. 1 shows a wellbore tubular 120 with one ball valve 200, it should be understood that any plurality of ball valves 200 of the embodiments described herein may be used in one or more wellbore tubular strings to achieve the results and advantages described herein.

The workover and/or drilling rig 106 may comprise a derrick 108 with a rig floor 110 through which the wellbore tubular string120 extends downward from the drilling rig 106 into the wellbore 114. The workover and/or drilling rig 106 may comprise a motor driven winch and other associated equipment for extending the wellbore tubular string 120 into the wellbore 114 to position the wellbore tubular string 120 at a selected depth. While the operating environment depicted in FIG. 1 refers to a stationary workover and/or drilling rig 106 for conveying the wellbore tubular string 120 comprising the ball valve 200 within a land-based wellbore 114, in alternative embodiments, mobile workover rigs, wellbore servicing units (such as coiled tubing units), and the like may be used to lower the wellbore tubular string 120 comprising the ball valve 200 into the wellbore 114. It should be understood that a wellbore tubular string 120 comprising the ball valve 200 may alternatively be used in other operational environments, such as within an offshore wellbore operational environment.

Regardless of the type of operational environment in which the ball valve 200 is used, it will be appreciated that the ball valve 200 serves to control the flow of fluid through a tubular or conduit, including situations in which the flow of fluid occurs from both sides of the ball valve 200.

The ball valve 200 generally may be used to control the flow of a fluid in a subterranean wellbore 114. In an embodiment, a ball valve 200 as described herein may be provided and disposed within the wellbore 114 in a subterranean formation 102. The ball valve 200 may form a part of a wellbore tubular string 120 and may be conveyed into and/or out of the wellbore 114 as part of the wellbore tubular string 120. Additional wellbore components such as one or more zonal isolation devices 140 may be used in conjunction with the ball valve 200 to control the flow of a fluid within the wellbore 114. In some embodiments, one or more ball valves 200 may be used with a wellbore tubular string 120 to control the flow of fluids within various zones of wellbore 114. The use of the ball valve 200 as disclosed herein may allow for control of the flow of a fluid into or out of the wellbore. In order to control the flow of a fluid in the wellbore 114, the ball valve 200 may be activated from an open position to a closed position or from a closed position to an open position to selectively allow (e.g., in the open position) or disallow (e.g., in the closed position) fluid flow from the wellbore tubular string to the formation or vice-versa. In an embodiment, the ball valve 200 may be activated to any point in between an open position and a closed position.

While the ball valve 200 is described in the context of a subterranean wellbore environment, it should be understood that the ball valve 200 of the present disclosure may be used in an industry or use in which it is desirable to control the flow of a fluid that may have a differential pressure from either side of the ball valve 200 (e.g., pipelines, refineries, chemical plants, manufacturing facilities, water treatment/storage/supply, etc.).

Figure 2A:
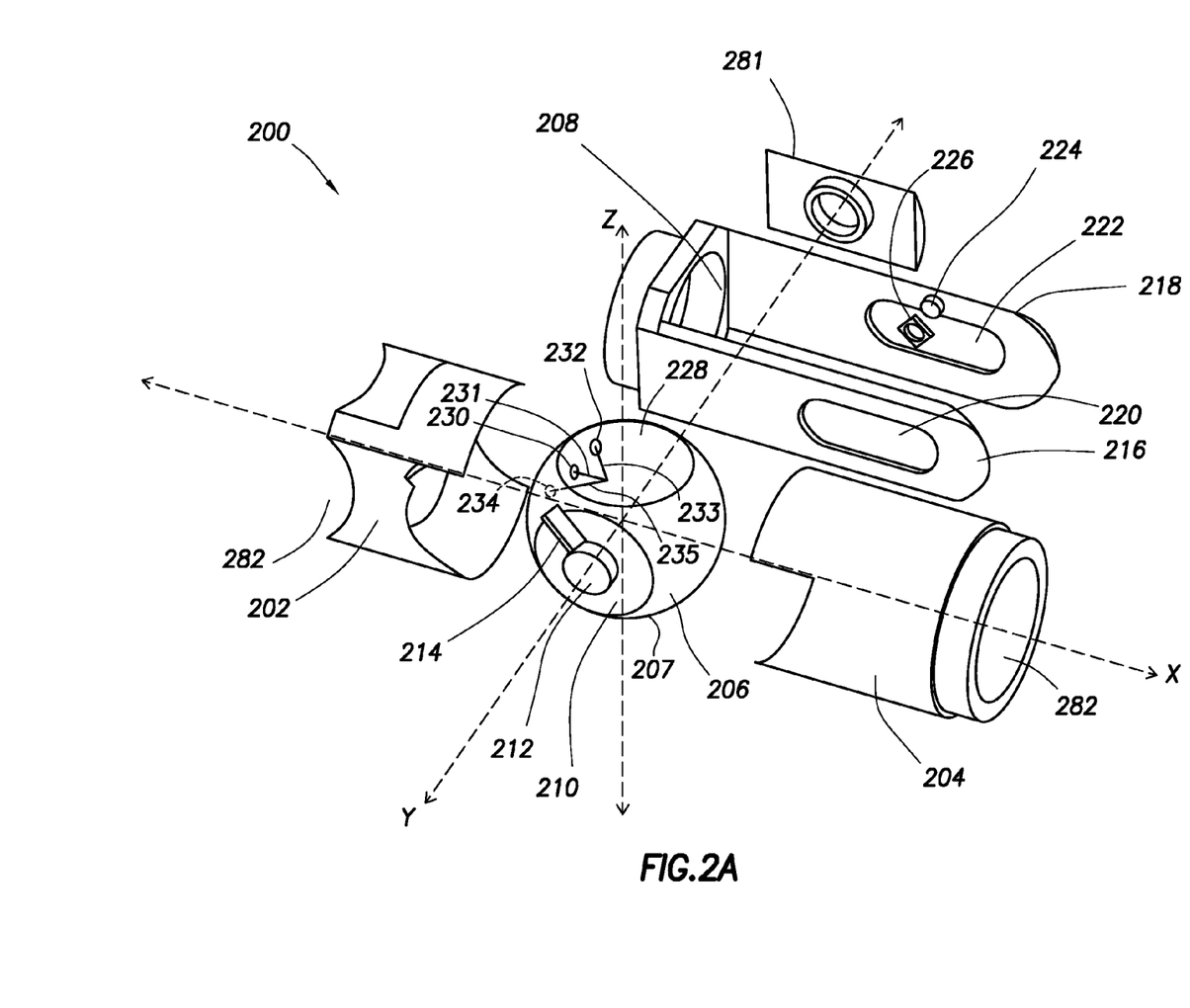
FIG. 2A is an isometric view of an embodiment of a ball valve.

With reference to FIG. 2A, the ball valve 200 may generally comprise a ball 206 that can be sealed against, an actuation member 208 that can open and/or close the ball valve 200, retaining members 202 and 204 positioned on opposite sides of the ball 206, components (e.g., seat surfaces of FIGS. 3A or 3B) which provide two or more seals (e.g., ball/seat interfaces) and can prevent fluid leakage, or combinations thereof. The ball valve 200 may also comprise components (e.g., a threaded connection) located above or below the ball valve 200 to allow the ball valve 200 to be disposed within and/or coupled to a wellbore tubular (e.g., of the wellbore tubular string 120 in FIG. 1) and/or other wellbore components (e.g., production subs, downhole tools, screens, etc.), for example to form a workstring, production string, conveyance string, etc.

In embodiments, the ball 206 may comprise a truncated sphere having planar surfaces 210 on opposite sides of the sphere. Planar surfaces 210 may each have a projection 212 (e.g., cylindrical projections) extending outwardly therefrom, and a radial groove 214 extending from the projection 212 to the edge of the planar surface 210. The ball may comprise a fluid passage 228 having longitudinal axis aligned with axis Z when in the closed position and aligned with axis X when in the open position. In FIG. 2A, the ball 206 is shown in the closed position. To rotatably move the ball 206 to the open position (e.g., within a housing of the ball valve 200), the ball 206 may be rotated (e.g., clockwise) about axis Y so that the longitudinal axis of the fluid passage 228 of the ball 206 is aligned with axis X. To rotatably move the ball 206 to the closed position, the ball 206 may be rotated (e.g., counter clockwise) about axis Y so that the longitudinal axis of the fluid passage 228 of the ball 206 is aligned with axis Z. In embodiments, the open position and closed position may comprise a sealed position.

In embodiments, the ball 206 may comprise one, two, or a plurality of fluid paths (e.g., fluid path 230, fluid path 232, fluid path 234, or combinations thereof) formed through the ball 206. The fluid paths may fluidly connect a space or void area between two seat surfaces (e.g., the space 252 and seat surfaces 251 and 253 of FIG. 3A) with the fluid passage 228 of the ball 206, when the ball 206 is in the open position. Additionally or alternatively, the one or more fluid paths may fluidly connect a space between two seat surfaces (e.g., the space 252 and seat surfaces 251 and 253 of FIG. 3A) with the fluid passage 282. In FIG. 2A, each of the fluid paths 230, 232, and 234 comprises a hole formed in the ball 206. In alternative or additional embodiments, one or more of the fluid paths 230, 232, and 234 may comprise a groove or notch formed on a surface 207 of the ball 206, such as the grooves shown in the embodiment of FIG. 2B. In embodiments, the holes of the fluid paths 230, 232, and 234 in FIG. 2A may have a diameter less than about 10 mm; alternatively, less than about 5 mm; alternatively, less than about 1 mm. In embodiments, the holes of the fluid paths 230, 232, and 234 are substantially cylindrical. In additional or alternative embodiments, the holes of the fluid paths 230, 232, and 234 may be rectangular, circular, or square in a cross-section. In embodiments, the holes of the fluid paths 230, 232, and 234 may be of the same diameter or different diameters.

In embodiments, fluid path 230 may be formed along axis 231 of ball 206 which is in the X-Z plane of FIG. 2A. In additional or alternative embodiments, fluid path 232 may be formed along axis 233; additionally or alternatively, fluid path 234 may be formed along axis 235. Fluid path 232 may be oriented at an angle (e.g., about (pos) 45°) with respect to fluid path 230; additionally or alternatively, fluid path 234 may be oriented at an angle (e.g., about (neg) 45°) with respect to fluid path 230; additionally or alternatively, fluid path 234 may be oriented at an angle (e.g., about 90°) with respect to fluid path 232. That is, axis 233 along which fluid path 232 is formed may be oriented at an angle (e.g., about (pos) 45°) with respect to the axis 231 along which fluid path 230 is formed; additionally or alternatively, axis 235 along which fluid path 234 is formed may be oriented at an angle (e.g., about (neg) 45°) with respect to axis 231 along which fluid path 230 is formed; additionally or alternatively, axis 235 along which fluid path 234 is formed may be oriented at an angle (e.g., about 90°) with respect to axis 233 along which fluid path 232 is formed. In an embodiment, (pos) denotes clockwise rotation about axis Z and (neg) denotes counter-clockwise rotation about axis Z. In embodiments, axes 231, 233, and 235 may comprise radial axes of the ball 206.

The ball valve 200 may further comprise an actuation member 208 to open and/or close the ball valve 200 (e.g., that can actuate the ball 206 between an open position and closed position and/or a closed position and open position). The actuation member 208 may comprise two parallel arms 216, 218 which may be positioned about the ball 206 and the retaining members 202, 204. The actuation member 208 may be aligned such that arms 216, 218 are in a plane parallel to that of planar surfaces 210. Projections 212 may be received in windows 220, 222 through each of the arms 216, 218. Actuation pins 224 may be provided on each of the inner sides of the arms 216, 218. Pins 224 may be received within the grooves 214 on the ball 206. Bearings 226 may be positioned between each pin 224 and groove 214, and a housing member 281 (e.g., part of the housing 280 discussed in FIGS. 3A and 3B) may engage a projection 212 within the respective windows 220, 222.

In the open position, the ball 206 is positioned so as to allow flow of fluid through the ball valve 200 by allowing fluid to flow through a fluid passage 228 (e.g., an interior flow bore or flow passage) extending through the ball 206. During operation, the ball 206 is rotated about axis Y such that fluid passage 228 is rotated in and out of alignment with the flow of fluid, thereby forming a fluid seal with one or more seat surfaces (e.g., the seat surfaces in the discussion for FIGS. 3A or 3B), and opening or closing the valve. The flow passage 228 may have its longitudinal axis disposed at about 90° with respect to axis X when the ball 206 is in the closed position and the longitudinal axis may be aligned with axis X when the ball 206 is in the open position. The ball 206 may be rotated by linear movement of the actuation member 208 along axis X. The pins 224 move as the actuation member 208 moves, which causes the ball 206 to rotate due to the positioning of the pins 224 within the groove 214 on the ball 206.

Figure 2B:
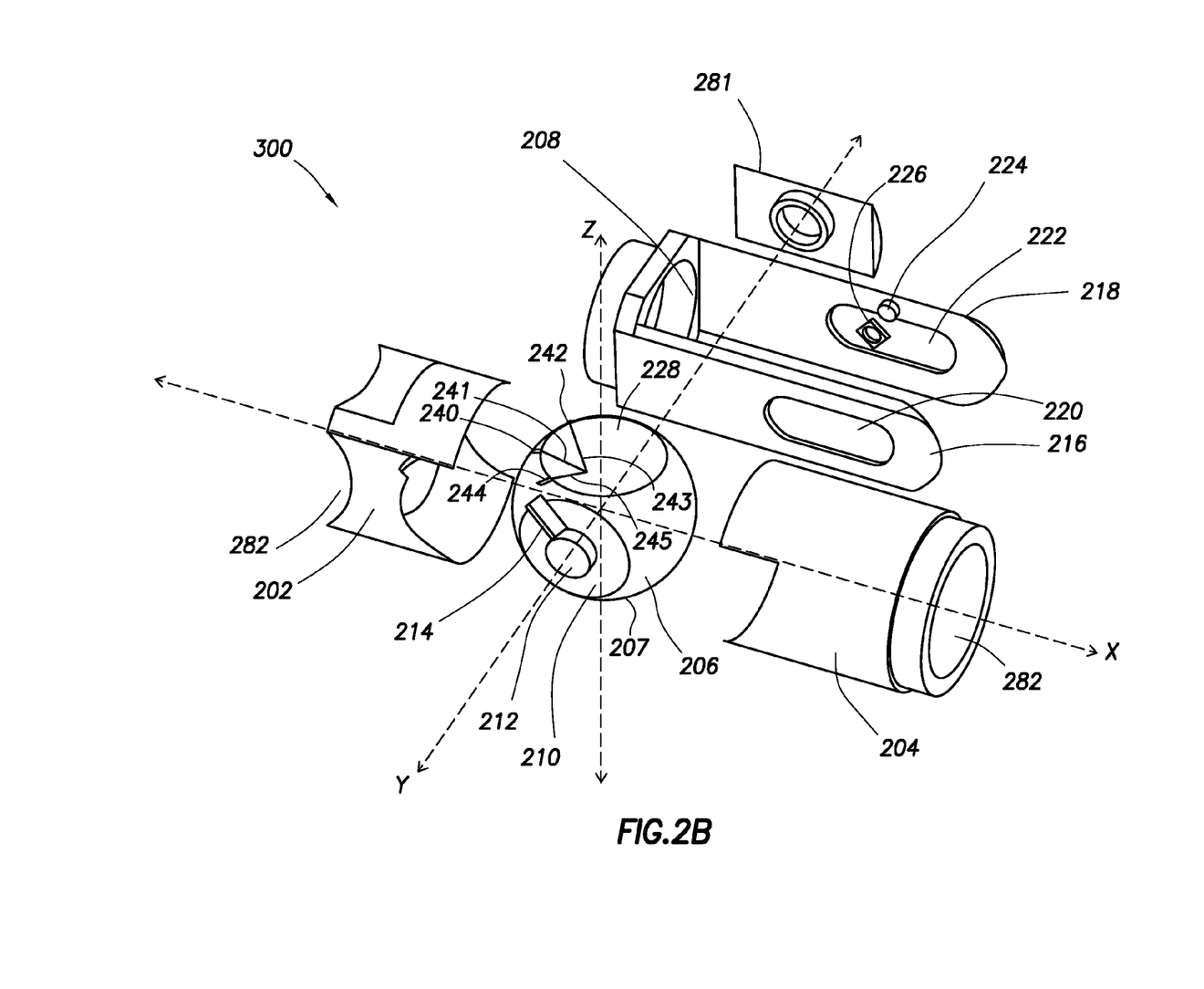
FIG. 2B is an isometric view of another embodiment of a ball valve.

FIG. 2B shows an alternative embodiment of the ball valve 300 where the one or more fluid paths 240, 242, and 244 comprises grooves formed in the surface 207 of the ball 206 of the ball valve 300.

In embodiments, the ball 206 may comprise one, two, or a plurality of fluid paths (e.g., fluid path 240, fluid path 242, fluid path 244, or combinations thereof) formed in the ball 206. The fluid paths may fluidly connect a space between two seat surfaces (e.g., the space 262 and seat surfaces 261 and 263 of FIG. 3B) with the fluid passage 228, when the ball 206 is in the open position. Additionally or alternatively, the one or more fluid paths (e.g., fluid path 240, fluid path 242, fluid path 244, or combinations thereof) may fluidly connect a space between two seat surfaces (e.g., the space 262 and seat surfaces 261 and 263 of FIG. 3B) with the fluid passage 282.

In FIG. 2B, each of the fluid paths 240, 242, and 244 comprises a groove or notch formed in the surface 207 of the ball 206. In alternative or additional embodiments, one or more of the fluid paths 240, 242, and 244 may comprise a hole formed in the ball 206, such as the holes shown in the embodiment of FIG. 2A. In embodiments, the grooves of the fluid paths 240, 242, and 244 in FIG. 2B may have a depth into the surface 207 of the ball 206 less than about 1 mm; alternatively, less than about 0.5 mm; alternatively, less than about 0.01 mm. In embodiments, the grooves of the fluid paths 240, 242, and 244 are substantially rectangular in cross-section, for example, when viewed in the X-Y plane. In embodiments, the grooves of the fluid paths 240, 242, and 244 may be of the same depth or different depths into the surface 207 of the ball 206 as one another.

In embodiments, fluid path 240 may be formed on the surface 207 of the ball 206 so as to intersect the X-Z plane of the ball valve 300. Fluid path 242 may be positioned on the surface 207 of the ball 206 such that an axis 243 intersecting the fluid path 242 is oriented at an angle (e.g., about (pos) 45°) with respect to an axis 241 intersecting fluid path 240; additionally or alternatively, fluid path 244 may be positioned on the surface 207 of the ball 206 such that an axis 245 intersecting the fluid path 244 is oriented at an angle (e.g., about (neg) 45°) with respect to an axis 241 intersecting fluid path 240; additionally or alternatively, fluid path 242 may be positioned on the surface 207 of the ball 206 such that axis 245 intersecting the fluid path 244 is oriented at an angle (e.g., about 90°) with respect to axis 243 intersecting fluid path 242. In embodiments, axes 241, 243, and 245 may comprise radial axes of the ball 206.

Figure 3A:
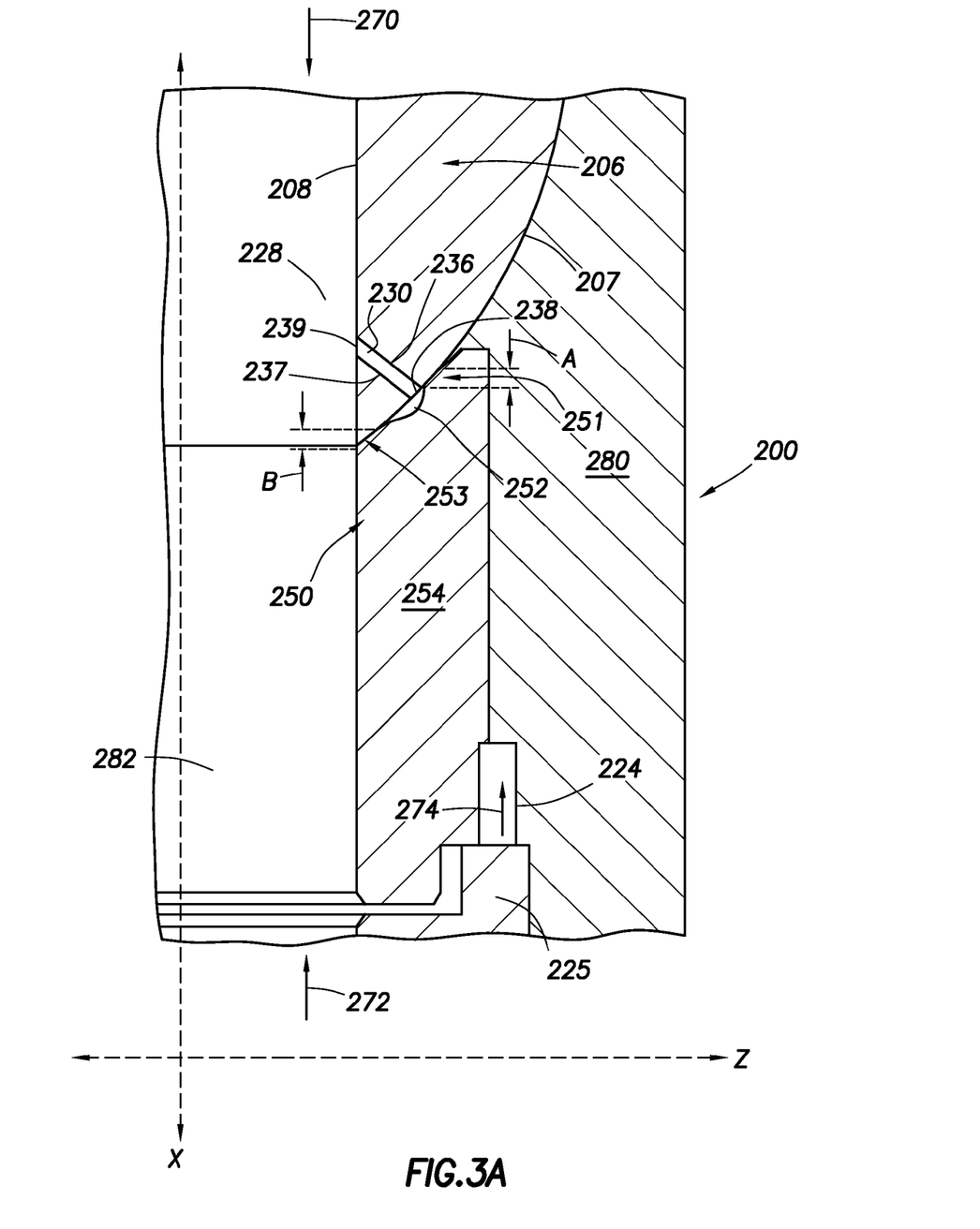
FIG. 3A is a schematic cross sectional view of the embodiment of the ball valve of FIG. 2A.

With reference to FIG. 3A, the ball valve 200 may comprise a ball 206 that can contact a first seat surface 251 and a second seat surface 253, where the first seat surface 251 and the second seat surface 253 may both be disposed on one seat member 254. As such, the movement of the first seat surface 251 is fixed relative to the second seat surface 253. As can be seen, the ball valve 200 may comprise a housing 280 disposed about components of the ball valve 200 (e.g., the ball 206, the seat 250 and seat member 254). The housing 280 may comprise one or more parts (e.g., housing member 281 of FIGS. 2A and 2B) which are disposed about the components of the ball valve 200. The ball 206 may be generally rotatable within the housing 280 between an open position and a closed position. Also shown in FIG. 3A, the ball valve 200 may comprise a biasing device 224 (e.g., a spring or springs) to provide a constant force on the seat 250 (e.g., seat member 254), thus providing a biasing force in the direction of arrow 274 to urge the first seat surface 251 and the second seat surface 253 to contact the ball 206 via the seat member 254. In an embodiment, the biasing device 224 may be disposed behind at least a portion of the seat member 254. In an embodiment, the biasing device 224 may be disposed above at least a portion of the seat member 254. In an embodiment, the ball valve 200 may further comprise a bottom sub 225 which connects the seat 250 and biasing device 224 to other components of the ball valve 200 (e.g., housing 280).

As shown in FIG. 3A, the first seat surface 251 and/or the second seat surface 253 may be in contact with the ball 206 and act to form one or two seals against the flow of fluid through the ball valve 200 when the ball valve 200 is in a closed position. The first seat surface 251 and the second seat surface 253 may comprise raised lands or protrusions on the surface of the seat member 254. In an embodiment, the first seat surface 251 and/or the second seat surface 253 may have a stepped configuration.

In an embodiment, the first seat surface 251 and the second seat surface 253 may be spherically matched to the surface 207 of the ball 206, which may comprise a spherical surface 207 that contacts the seat surfaces 251 and 253. By "spherically matched" it is meant the seat surfaces (e.g., first seat surface 251 and second seat surface 253) are contoured as an arc corresponding to an arc formed on the surface 207 of the ball 206 which is the surface (e.g., radial sweep, or portion of the circumference of the ball 206) between two radial axes of the ball 206. In alternative embodiments, the first seat surface 251 and/or the second seat surface 253 may comprise a knife edge or a lapped surface. A knife edge surface has a sharp edge in contact with the ball 206 to form a seal. However, as the contact pressure of the ball 206 with the knife edge seat increases, it is possible the ball 206 and/or the knife edge surface material may yield beyond its elastic limit, leading to a permanent deformation of the ball 206 and/or the seat. The resulting deformation may reduce the ability of the ball valve 200 to form a suitable seal. In applications where the use of knife edge surface may compromise the performance of the ball valve 200, the use of a matched surface contact may be appropriate. In such cases, the ball valve 200 of the present disclosure may reduce or avoid any deformation of the ball 206 and/or the seat surfaces 251, 253, enabling a consistent seal to be formed against the ball valve 200. In an embodiment, the ball 206 and/or spherically-matched seat surfaces 251 and 253 may grow while undergoing elastic deformation, but may not pass the yield point to undergo plastic deformation.

The seat surfaces 251 and 253 may be spherically matched to the ball 206 during the manufacturing process by starting with a spherically matched surface on the seating member 250 and removing a portion of the seat member 254, thereby forming space 252 (e.g., a concave space) to define the first seat surface 251 and the second seat surface 253. A variety of manufacturing techniques such as etching, abrasion, milling, or any other technique may be used to remove portions of the seat member 254 to form the seat surfaces 251 and 253. In another embodiment, the first seat surface 251 and the second seat surface 253 may be formed on the seat member 254 and subsequently machined to have a spherically matched surface with the ball 206. The first seat surface 251 and the second seat surface 253 associated with the seat member 254 may be formed of a suitable material such as metal. Suitable metals may be chosen based on several considerations including, but not limited to, the expected operating conditions of the ball valve 200 (e.g., the temperature, the operating pressures), the expected forces on the ball valve 200, and the chemical composition of the fluid in contact with the components of the ball valve 200. The ball 206 may also be formed from a suitable metal so that the seal formed between the ball 206 and the first seat surface 251 and/or the second seat surface 253 comprises a metal to metal contact.

The first seat surface 251 may provide a primary sealing surface when pressure is applied from above the ball 206 in the direction of arrow 270. The second seat surface 253 may provide the primary sealing surface when pressure is applied from below the ball 206 in the direction of arrow 272.

Each of the seat surfaces 251 and 253 may comprise a width. The width of the seat surfaces 251 and 253 refers to the length of the seat surface 251 or 253 in contact with the ball 206 in the direction of the central longitudinal axis of the ball valve 200 (e.g., axis X of FIGS. 2A, 2B, 3A and 3B). For example, in FIG. 3A, the width of the first seat surface 251 refers to length A, and the width of the second seat surface 253 refers to length B. The width of the seat surfaces 251 and 253 may affect the contact pressure between the seat surfaces 251 and 253 and the ball 206, and the resistance to rotating the ball 206 between the open and closed positions. In an embodiment, the width of the first seat surface 251 and/or the second seat surface 253 may be chosen to reduce the contact pressure between the ball 206 and the seat surfaces 251 and 253 to a value that is less than the pressure that may result in yielding of the materials of the seat surfaces 251 or 253 and/or the ball 206 material. Suitable widths for seat surfaces 251 and 253 may include less than about 5 mm; alternatively, less than about 4 mm; alternatively, less than about 3 mm; alternatively, less than about 2 mm; alternatively, less than about 1 mm; alternatively, less than about 0.5 mm; alternatively, less than about 0.1 mm. Seat surfaces 251 or 253 may have the same or different widths.

In various embodiments, the width of the first seat surface 251 and the second seat surface 253 may be the same or may be different. For example having the same width for first seat surface 251 and second seat surface 253 may allow for the same sealing area on the surface of the ball 206 by the first seat surface 251 and the second seat surface 253. As such, the same sealing force may be available for pressures emanated below the ball valve 200 (e.g., in the direction of arrow 272) as the sealing force available for pressures emanating from above the ball valve 200 (e.g., in the direction of arrow 270). Having a width for the first seat surface 251 different than the width of the second seat surface 253 may allow for different sealing areas on the surface 207 of the ball 206 by the first seat surface 251 and second seat surface 253. For example, the first seat surface 251 may comprise a knife edge while the second seat surface 253 may comprise a spherically matched surface, or vice versa. The knife edge (e.g., of the second seat surface 253) may provide quick sealing capabilities as a primary seal in the event of a downhole blowout while the spherically matched surface (e.g., of the first seat surface 253) may provide a sealing capability which is relatively slower than the knife edge yet higher in contact area and higher in contact force on the surface 207 of the ball 206. In such embodiments, the advantages of both a knife edge seal and a spherically matched seal may be achieved using the disclosed ball valve 200.

The fluid path 230 will now be discussed. Unless noted, the description for fluid path 230 shall be likewise applicable for fluid paths 232 and 234 (shown in FIG. 2A). As can be seen in FIG. 3A, the fluid path 230 extends through the ball 206 so as to fluidly connect the space 252 between the first seat surface 251 and the second seat surface 253 with the fluid passage 228 of the ball 206 when the ball 206 is in the open position (e.g., fluid passage 228 and fluid passage 282 form a continuous fluid passage and may be in fluid communication with flow bore of the wellbore tubular string 120 of FIG. 1). In FIG. 3A, the fluid path 230 extends at an angle relative to the longitudinal axis (e.g., axis X) of the ball valve 200 when the ball 206 is in the open position. It should be understood the fluid path 230 may extend at any angle relative to axis X which is suitable for connecting the space 252 and the fluid passage 228.

The sides 236 and 237 of the fluid path 230 are shown in FIG. 3A as parallel to one another; however, in alternative embodiments, side 236 may extend at an angle relative to side 237, side 237 may extend at an angle relative to side 236, or combinations thereof. Moreover, sides 236 and 237 are shown in FIG. 3A as straight; however, in alternative embodiments, the sides 236 and 237 may have portions which are angled, curved or combinations thereof.

In FIG. 3A, end 238 of the fluid path 230 can be seen as opening to the space 252 (e.g., from the surface 207 of the ball 206) while end 239 of the fluid path 230 can be seen as opening to the fluid passage 228 of the ball 206 (e.g., from the interior surface 208 of the ball 206). Fluid in the space 252 may enter end 238 of the fluid path 230, pass through the fluid path 230, exit the fluid path 230 via end 239, and pass into the fluid passage 228 of the ball 206. Fluid in the fluid passage 228 of the ball 206 may enter end 239 of the fluid path 230, pass through the fluid path 230, exit the fluid path 230 via end 238, and pass into the space 252 between the first seat surface 251 and the second seat surface 253. End 238 of the fluid path 230 may generally comprise the shape of the surface 207 of the ball 206, and end 239 of the fluid path 230 may generally comprise the shape of the interior surface 208 of the ball 206.

The fluid transfer through the fluid path 230 may comprise equalizing of the fluid pressure in the space 252 with the fluid pressure in the passage 228 of the ball 206, equalizing of the fluid pressure in the space 252 with the fluid pressure in the passage 282 of the housing 280, or both. The fluid transfer through the fluid path 230 may additionally or alternatively comprise balancing of the fluid pressure in the space 252 with the fluid pressure in the passage 228 of the ball 206, balancing of the fluid pressure in the space 252 with the fluid pressure in the passage 282 of the housing, or both. The fluid pressures may be equalized by having less than about 5, 4, 3, 2, 1, or less percent difference between the fluid pressure in the space 252 and the fluid pressure in passage 228 and/or 282. The fluid pressures may be balanced by having less than about 10, 9, 8, 7, 6, 5, 4, 3, 2, 1, or less percent difference between the fluid pressure in the space 252 and the fluid pressure in passage 228 and/or 282.

In an embodiment, the fluid path 230 (additionally or alternatively, fluid paths 232 and 234 shown in FIG. 2A) may limit the clutch loading on the ball 206 when the ball 206 is opened or closed with a differential pressure across the ball valve 200. As used herein, clutch loading may refer to the drag or friction force that arises due to the contact between the seat surfaces (e.g., seat surfaces 251 and 253) and the ball 206 and generally resists relative motion between the ball 206 and the seat surfaces (e.g., seat surfaces 251 and 253). In an embodiment, the actuation member 208 may be limited in the amount of torque that can be applied to the ball 206 to open or close the ball valve 200. By fluidly connecting the space 252 with the fluid passage 228 via a fluid path 230, the clutch loading may be limited to a value below the amount of torque that can be exerted by the actuation member 208, thereby ensuring that the valve 200 may be opened and or closed.

Figure 3B:
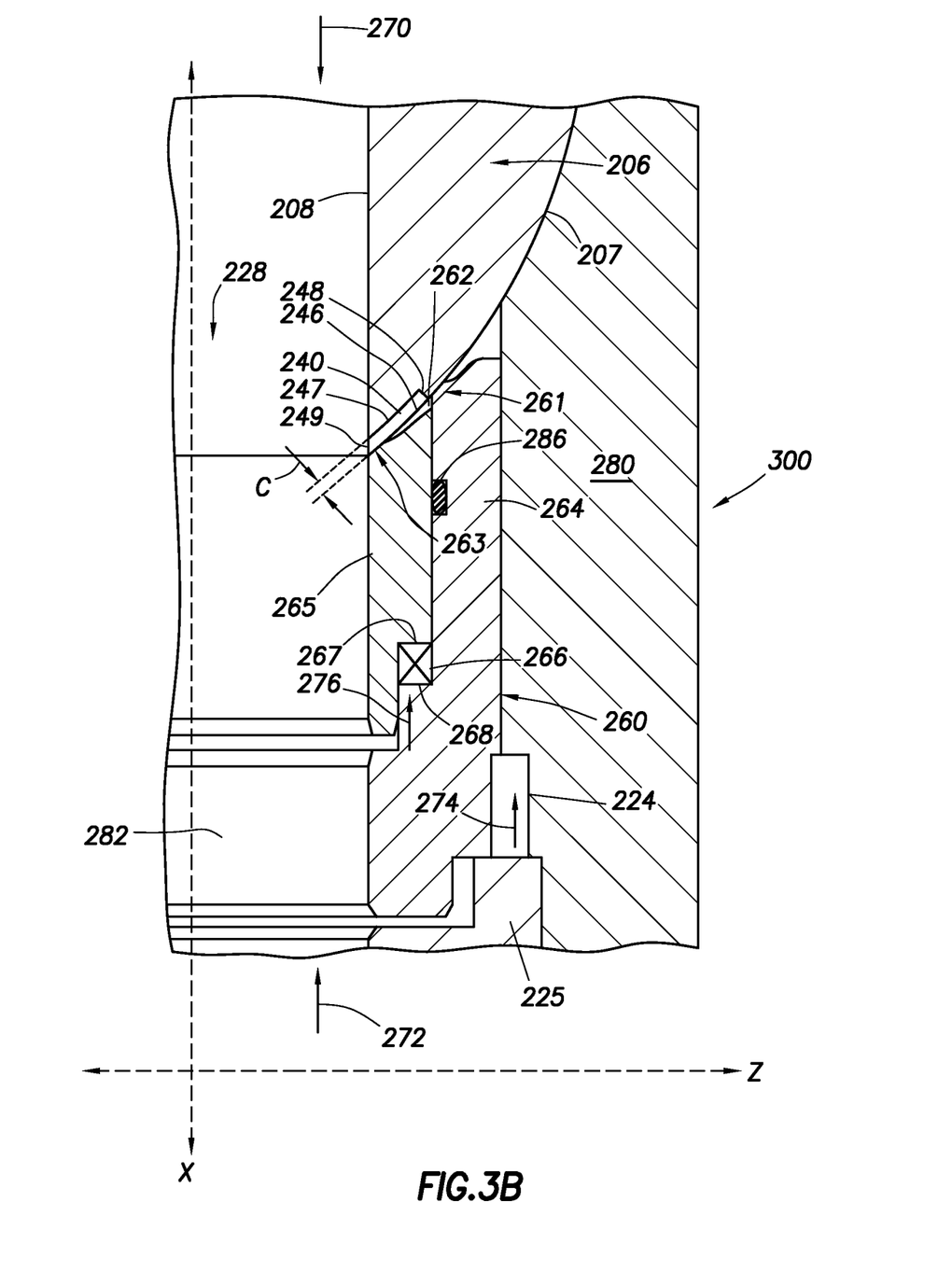
FIG. 3B is a schematic cross sectional view of the embodiment of the ball valve of FIG. 2B.

With reference to FIG. 3B, the ball valve 300 generally may have the same configuration as that of FIG. 3A. For example, the ball valve 300 of FIG. 3B may comprise a housing 280 disposed about the ball 206, a seat 260, a biasing device 224 such as a spring or springs to provide a constant force on the seat 260 (e.g., on seat member 264), and a bottom sub 225 which connects the seat 260 to other components of the ball valve 300 (e.g., housing 280).

Different from the embodiment in FIG. 3A, the ball valve 300 of FIG. 3B may comprise two seat members 264 and 265 (i.e., instead of one seat member 254 as in FIG. 3A). A first seat surface 261 may be associated with the first seat member 264, and a second seat surface 263 may be associated with the second seat member 265. In such embodiments, the first seat surface 261 may be movable (e.g., may contact the ball 206 independently) relative to the second seat surface 263. For example, the ball valve 300 may further comprise a biasing device 266 (e.g., a spring or springs) positioned between a shoulder 267 of the second seat member 265 and a shoulder 268 of the first seat member 264. The biasing device 266 may provide a constant force on the shoulder 267 of the second seat member 265 in the direction of arrow 276. In such embodiments, biasing device 224 may provide force on the first seat member 264 while biasing device 266 may provide force on the second seat member 265, and biasing device 266 may operate independently of biasing device 224. As such, the first seat member 264 may seal against the ball 206 independently of the second seat member 265 (e.g., at alternative or different sealing forces).

In embodiments, a seal 286 (e.g., an o-ring, T-seal, or combinations thereof) may be included to form a seal between the first seat member 264 and the second seat member 265.

In embodiments, the first seat member 264 and/or the second seat member 265 may be flexible. Flexing of the first seat member 264 and/or second seat member 265 when under external pressure may add to the sealing effect.

As shown in FIG. 3B, the first seat surface 261 and/or the second seat surface 263 may be in contact with the ball 206 and act to form one or two seals against the flow of fluid through the ball valve 300 when the ball valve 300 is in the closed position. The first seat surface 261 and the second seat surface 263 may comprise raised lands or protrusions on the surface of the seat members 264 and 265. In an embodiment, the first seat surface 261 and/or the second seat surface 263 may have a stepped configuration. Like the seat surfaces in FIG. 3A, the first seat surface 261 and the second seat surface 263 may be spherically matched to the surface 207 of the ball 206, or may comprise a knife edge or a lapped surface.

The first seat surface 261 and second seat surface 263 may provide the primary and secondary sealing surfaces as described for the seat surfaces 251 and 253 of FIG. 3A. Moreover, each of the seat surfaces 261 and 263 may comprise a width such as that described for seat surfaces 251 and 253 of FIG. 3A.

The force of biasing device 266 may keep the second seat member 265 in contact with the ball 206. The biasing device 266 may allow the second seat member 265 to float away from the ball 206 when subjected to pressure in the direction of arrow 270. The second seat member 265 may float in a plane parallel to the axis X (e.g., an X-Y plane). This floating of the second seat member 265 aids the first seat member 264 in contacting the ball 206 without any interference from the second seat member 265.

When pressure acts in the direction of arrow 272, the force generated by the pressure pushes the second seat surface 263 against the ball 206. The biasing device 266 assists in generating the seal.

Ball valves 200 and 300 are shown in FIGS. 3A and 3B, respectively, as being positioned such that the first and second seat members 264 and 265 act on the right side of the ball 206. In an alternative embodiment, the first and second seat members 264 and 265 can be positioned to act on the left side of the ball 206. In an alternative embodiment, the first and second seat members 264 and 265 can be positioned to act on the left and right side of the ball 206. In a further embodiment, the first and second seat members 264 and 265 can be positioned to act on the right and/or left side of the ball 206 while other seat member(s) act on the corresponding opposite side.

The fluid path 240 will now be discussed. Unless noted, the description for fluid path 240 shall be applicable for fluid paths 242 and 244 (shown in FIG. 2B). The fluid path 240 may extend along the surface 207 of the ball 206 so as to fluidly connect the space 262 between the first seat surface 261 and the second seat surface 263 with the fluid passage 282 of the housing 280, with the fluid passage 228 of the ball 206, or both, when the ball 206 is in the open position (i.e., fluid passage 228 and fluid passage 282 form a continuous fluid passage and may be in fluid communication with flow bore of the wellbore tubular string 120).

As can be seen in FIG. 3B, the fluid path 240 may comprise a groove, trough, or notch formed in the surface 207 of the ball 206. The fluid path 240 in FIG. 3B is shown with a rectangular cross section; however, the cross section may be of any suitable shape. The depth C of the fluid path 340 formed in the surface 207 of the ball 206 may comprise a depth suitable for the passage of fluid from the space 262 to the fluid passage 282 of the housing 280. For example, the depth of the fluid path 240 may be less than about 1 mm; alternatively, less than about 0.1 mm; alternatively, less than about 0.01 mm. In an alternative embodiment, the fluid path 240 can be formed into the ball to open in the fluid passage 228 of the ball 206. In such an embodiment, the fluid path 240 can fluidly connect the space 262 with both the fluid passage 282 of the housing 280 and the fluid passage 228 of the ball 206.

The sides 246 and 247 of the fluid path 240 are shown in FIG. 3B as parallel to one another; however, in alternative embodiments, side 247 may extend at an angle relative to side 246. Side 246 may generally follow the contour the surface 207 of the ball 206. Side 247 may comprise portions which are angled, curved or combinations thereof.

In FIG. 3B, side 246 of the fluid path 240 can be seen as opening to the space 262 (e.g., from the surface 207 of the ball 206) while end 249 of the fluid path 230 can be seen as opening to the fluid passage 228 of the ball 206 (e.g., from the interior surface 208 of the ball 206) and to the fluid passage 282 of the housing 280. In the fluid path 240, fluid may transfer from the space 262 through the fluid path 240 and into the fluid passage 282 of the housing 280, the fluid passage 228 of the ball 206, or both. In embodiments, the fluid transferring from the space 262 to the fluid passage 282 of the housing 280 may pass into the fluid passage 228 of the ball 206 before entering the fluid passage 282 of the housing 280. For example, fluid in the space 262 may enter side 246 of the fluid path 240 adjacent end 248 of the fluid path 240, pass through the fluid path 240, exit the fluid path 240 via end 249 or via side 246 adjacent end 249, and pass into the fluid passage 228 of the ball 206 and/or the fluid passage 282 of the housing 280. Fluid in the fluid passage 228 of the ball 206 may enter fluid path 240 via end 249 or via the side 246 adjacent the end 249, pass through the fluid path 240, exit the fluid path 240 via side 246 adjacent end 248, and pass into the space 262 between the first seat surface 261 and the second seat surface 263. Fluid in the fluid passage 282 of the housing 280 may enter the fluid path 240 via end 249 or via side 246 adjacent end 249, pass through the fluid path 240, exit the fluid path 240 via side 246 adjacent end 248, and pass into the space 262 between the first seat surface 261 and the second seat surface 263.

The fluid transfer through the fluid path 240 may comprise equalizing of the fluid pressure in the space 262 with the fluid pressure in the passage 228 of the ball 206, equalizing of the fluid pressure in the space 262 with the fluid pressure in the passage 282 of the housing 280, or both. The fluid pressures may be equalized by having less than about 5, 4, 3, 2, 1, or less percent difference between the fluid pressure in the space 262 and the fluid pressure in passage 228 and/or 282. The fluid transfer through the fluid path 230 may additionally or alternatively comprise balancing the fluid pressure in the space 262 with the fluid pressure in the passage 228 of the ball 206, balancing of the fluid pressure in the space 262 with the fluid pressure in the passage 282 of the housing, or both. The fluid pressures may be balanced by having less than about 10, 9, 8, 7, 6, 5, 4, 3, 2, 1, or less percent difference between the fluid pressure in the space 262 and the fluid pressure in passage 228 and/or 282.

As does the fluid path 230 in FIG. 3A, the fluid path 240 of FIG. 3B may limit the clutch loading on the ball 206 when the ball 206 is opened or closed with a differential pressure across the ball valve 300. By fluidly connecting the space 262 with the fluid passage 228 and/or fluid passage 282 via a fluid path 240, the clutch loading may be limited to a value below the amount of torque that can be exerted by the actuation member 208, thereby ensuring that the valve 300 may be opened and/or closed. The use of one, two, or a plurality of fluid paths may allow for a sufficient contact pressure to achieve a seal while limiting the clutch loading on the ball 206. With the use of the fluid paths disclosed herein, fluid may flow from the space 262 to the fluid passage 228 and/or fluid passage 282 (and vice versa) to equalize the pressures therein.

The equalization of pressure may allow for the use of standard actuation members in high pressure operating environments, which may reduce cost compared to more powerful actuation members and may reduce power consumption of actuation over the life of the ball valve 300.

The two or more (e.g., plurality of) seat surfaces (e.g., 251 and 253 of FIG. 3A, 261 and 263 of FIG. 3B) may create a redundancy to allow the disclosed ball valves to maintain a seal under the various conditions experienced during the use of the ball valve, which may be useful in a variety of situations. While a pair of seat surfaces are shown in the Figures, more than two (e.g., 3, 4, 5, etc.) may be used. For example, one of the seat surfaces 251 and 253 may become damaged during the closing of a ball valve 200, leading to an inability to form an adequate seal. As such, the other seat surfaces (i.e., 1, 2, 3, 4, etc. other seat surfaces) may ensure adequate sealing. Moreover, the types of fluids passing through the ball valve 200/300 can vary widely and can include abrasive materials such as formation solids and/or fracturing proppant. When coupled with high flow rates (e.g., 15 to 20 barrels per minute), the fluid velocity passing through the ball valve 200/300 can approach and/or exceed the erosion and cutting velocity limits of common ball valve construction materials. The erosion and cutting effects tend to increase as the solids content of the fluid increases and the fluid velocities increase. During the closing of the ball valve 200/300, the available flow cross section through the ball valve 200/300 decreases, resulting in an increased flow rate of the fluid through the ball valve 200/300. In ball valves with a single seat surface, the erosion and/or cutting of the surface may lead to a failure of the seal. As an advantage over single seat systems, the ball valves of the present disclosure allow for the use of two or more seals via corresponding seat surfaces (e.g., associated with a single seat member or multiple seat members). Thus, the present ball valve may be capable of handling harsher conditions and/or being exposed to erosive materials for a longer time than a single seat ball valve. The redundancy may be created in the sealing ability of the ball valve through the use of a plurality of seats via seat surfaces.

Embodiments having spherically matched seat surfaces are less likely to cause deformation or yielding of the ball and/or the seat surfaces which represents an advantage over ball valves using a knife edge sealing surface. Further, the choice of the position and/or width of the seat surfaces may allow the load to be balanced on the ball and its supports within the ball valve, reducing the peak loads that may be experienced by the components of the ball valve. As a result, the ball valve may be composed of less expensive materials and the overall size of the components may be reduced.

The use of one or more of the embodiments of fluid paths disclosed herein may provide an advantage of the ability for the ball valve of the present disclosure to rotatably move (e.g., actuate) in high pressure applications which would otherwise hinder movement of the ball of the ball valve due to the high sealing force of the seats with the ball. For example, the use of one, two, or a plurality of fluid paths may allow for a sufficient contact pressure to achieve a seal while limiting the clutch loading on the ball. This represents an advantage over the use of a valve having no fluid path since the existence of a pressure pocket (e.g., atmospheric pressure) in the space between a first seat surface and a second seat surface can result in a clutch loading exceeding the torque available for actuating the ball valve. With the use of the fluid paths disclosed herein, fluid may flow from the space between two seat surfaces to a fluid passage (of the ball and/or housing), or vice versa, and equalize and/or balance the pressures therein. The equalization and/or balancing of pressure may allow for the use of standard actuation members in high pressure operating environments, which may reduce cost compared to more powerful actuation members and may reduce power consumption of actuation over the life of the ball valve. Moreover, the equalization and/or balancing of pressure may provide a contact force between a seat surfaces (e.g., first seat surface 261 and/or second seat surface 263) and the ball 206 which is lower than would occur without use of a fluid path.

ADDITIONAL DISCLOSURE

The following are additional enumerated embodiments of the concepts disclosed herein.

A first embodiment, which is a ball valve comprising a housing comprising a fluid passage, a first seat surface, a second seat surface, and a ball rotatably movable within the housing between an open position allowing flow through the fluid passage of the housing and a closed position preventing flow through the fluid passage of the housing, wherein the ball contacts the first seat surface and the second seat surface to form one or more seals within the ball valve, wherein the ball comprises a fluid passage and a fluid path, wherein the fluid path fluidly connects a space between the first seat surface and the second seat surface with the fluid passage of the housing, with the fluid passage of the ball, or both, when the ball is in the open position.

A second embodiment, which is the ball valve of the first embodiment, wherein the fluid path comprises a hole formed in the ball.

A third embodiment, which is the ball valve of the first embodiment, wherein the fluid path comprises a groove formed on a surface of the ball.

A fourth embodiment, which is the ball valve of the first through third embodiments, further comprising a seat member associated with the first seat surface and the second seat surface, wherein the first seat surface and the second seat surface are fixed relative to each other.

A fifth embodiment, which is the ball valve of the fourth embodiment, further comprising a biasing device arranged to bias the first seat surface, the second seat surface, or both, into contact with the ball.

A sixth embodiment, which is the ball valve of the fifth embodiment, wherein the biasing device comprises at least one spring.

A seventh embodiment, which is the ball valve of the first through third embodiments, further comprising a first seat member associated with the first seat surface, and a second seat member associated with the second seat surface, wherein the first seat member and the second seat member are movable relative to each other.

An eighth embodiment, which the ball valve of the seventh embodiment, further comprising a biasing device arranged to bias the first seat surface, the second seat surface, or both, into contact with the ball.

A ninth embodiment, which is the ball valve of the eighth embodiment, wherein the biasing device is arranged to bias the second seat surface into contact with the ball independently of the first seat surface.

A tenth embodiment, which is the ball valve of the eighth through the ninth embodiments, wherein the biasing device comprises at least one spring.

An eleventh embodiment, which is the ball valve of the first through tenth embodiments, further comprising an actuation member to open or close the ball valve.

A twelfth embodiment, which is a ball valve comprising a housing comprising a fluid passage, a first seat surface, a second seat surface, and a ball rotatably movable within the housing between an open position allowing flow through the fluid passage of the housing and a closed position preventing flow through the fluid passage of the housing, wherein the ball contacts the first seat surface and the second seat surface to form one or more seals within the ball valve, wherein the ball comprises a fluid passage and a plurality of fluid paths, wherein each of the plurality of fluid paths fluidly connects a space between the first seat surface and the second seat surface with the fluid passage of the housing, with the fluid passage of the ball, or both, when the ball is in the open position.

A thirteenth embodiment, which is the ball valve of the twelfth embodiment, wherein the plurality of fluid paths comprises a first fluid path, and a second fluid path oriented about ±45° with respect to the first fluid path.

A fourteenth embodiment, which is the ball valve of the thirteenth embodiment, wherein the plurality of fluid paths further comprises a third fluid path oriented about ±45° with respect to the first fluid path and about 90° with respect to the second fluid path.

A fifteenth embodiment, which is the ball valve of the twelfth through fourteenth embodiments, wherein each of the plurality of fluid paths comprises a hole formed in the ball or a groove formed on a surface of the ball.

A sixteenth embodiment, which a method comprising providing a ball valve that comprises a housing comprising a fluid passage, a first seat surface, a second seat surface, and a ball rotatably movable within the housing between an open position allowing flow through the fluid passage of the housing and closed position preventing flow through the fluid passage of the housing, wherein the ball contacts the first seat surface and the second seat surface to form one or more seals within the ball valve, wherein the ball comprises a fluid passage and a fluid path, wherein the fluid path fluidly connects a space between the first seat surface and the second seat surface with the fluid passage of the housing, with the fluid passage of the ball, or both, when the ball is in the open position; disposing the ball valve within a wellbore tubular string penetrating a subterranean formation; and activating the ball valve from an open position to a closed position or from a closed position to an open position to selectively allow or disallow fluid flow from the wellbore tubular string to the formation or vice-versa.

A seventeenth embodiment, which is the method of the sixteenth embodiment, further comprising balancing a fluid pressure in the space with a fluid pressure in the fluid passage of the housing, balancing a fluid pressure in the space with a fluid pressure in the fluid passage of the ball, or both.

An eighteenth embodiment, which is the method of the sixteenth through seventeenth embodiments, further comprising providing a contact force between the first seat surface and the ball which is lower than would occur without the fluid path.

A nineteenth embodiment, which is the method of the sixteenth through eighteenth embodiments, further comprising equalizing a fluid pressure in the space with a fluid pressure in the fluid passage of the housing, equalizing a fluid pressure in the space with a fluid pressure in the fluid passage of the ball, or both.

A twentieth embodiment, which is the method of the sixteenth through nineteenth embodiments, wherein the wellbore tubular string comprises a plurality of the ball valves.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A ball valve comprising:
   a housing comprising a fluid passage;
   a first seat surface;
   a second seat surface; and
   a ball rotatably movable within the housing between an
      open position allowing flow through the fluid passage
      of the housing and a closed position preventing flow
      through the fluid passage of the housing, wherein the ball contacts the first seat surface and the second seat surface to form one or more seals within the ball valve when the ball is in the open position, wherein the ball comprises a fluid passage and a fluid path, wherein the fluid passage of the ball is oriented parallel to the fluid passage of the housing when the ball is in the open position, and wherein the fluid path fluidly connects a space between the first seat surface and the second seat surface with the fluid passage of the housing, with the fluid passage of the ball, or both, when the ball is in the open position.

2. The ball valve of claim 1, wherein the fluid path comprises a hole formed in the ball.

3. The ball valve of claim 1, wherein the fluid path comprises a groove formed on a surface of the ball.

4. The ball valve of claim 1, further comprising:
a seat member associated with the first seat surface and the second seat surface, wherein the first seat surface and the second seat surface are fixed relative to each other.

5. The ball valve of claim 4, further comprising a biasing device arranged to bias the first seat surface, the second seat surface, or both, into contact with the ball.

6. The ball valve of claim 5, wherein the biasing device comprises at least one spring.

7. The ball valve of claim 1, further comprising:
a first seat member associated with the first seat surface; and
a second seat member associated with the second seat surface;
wherein the first seat member and the second seat member are movable relative to each other.

8. The ball valve of claim 7, further comprising a biasing device arranged to bias the first seat surface, the second seat surface, or both, into contact with the ball.

9. The ball valve of claim 8, wherein the biasing device is arranged to bias the second seat surface into contact with the ball independently of the first seat surface.

10. The ball valve of claim 8, wherein the biasing device comprises at least one spring.

11. The ball valve of claim 1, further comprising an actuation member to open or close the ball valve.

12. A ball valve comprising:
a housing comprising a fluid passage;
a first seat surface;
a second seat surface; and
a ball rotatably movable within the housing between an open position allowing flow through the fluid passage of the housing and a closed position preventing flow through the fluid passage of the housing, wherein the ball contacts the first seat surface and the second seat surface to form one or more seals within the ball valve when the ball is in the open position, wherein the ball comprises a fluid passage and a plurality of fluid paths, wherein the fluid passage of the ball is oriented parallel to the fluid passage of the housing when the ball is in the open position, and wherein each of the plurality of fluid paths fluidly connects a space between the first seat surface and the second seat surface with the fluid passage of the housing, with the fluid passage of the ball, or both, when the ball is in the open position.

13. The ball valve of claim 12, wherein the plurality of fluid paths comprises:
a first fluid path; and
a second fluid path oriented about ±45° with respect to the first fluid path.

14. The ball valve of claim 13, wherein the plurality of fluid paths further comprises a third fluid path oriented about ±45° with respect to the first fluid path and about 90° with respect to the second fluid path.

15. The ball valve of claim 12, wherein each of the plurality of fluid paths comprises a hole formed in the ball or a groove formed on a surface of the ball.

16. A method comprising:
providing a ball valve that comprises:
a housing comprising a fluid passage;
a first seat surface;
a second seat surface; and
a ball rotatably movable within the housing between an open position allowing flow through the fluid passage of the housing and closed position preventing flow through the fluid passage of the housing, wherein the ball contacts the first seat surface and the second seat surface to form one or more seals within the ball valve when the ball is in the open position, wherein the ball comprises a fluid passage and a fluid path, wherein the fluid passage of the ball is oriented parallel to the fluid passage of the housing when the ball is in the open position, and wherein the fluid path fluidly connects a space between the first seat surface and the second seat surface with the fluid passage of the housing, with the fluid passage of the ball, or both, when the ball is in the open position;
disposing the ball valve within a wellbore tubular string penetrating a subterranean formation; and
activating the ball valve from the open position to the closed position or from the closed position to the open position to selectively allow or disallow fluid flow from the wellbore tubular string to the formation or vice-versa.

17. The method of claim 16, further comprising balancing a fluid pressure in the space with a fluid pressure in the fluid passage of the housing, balancing a fluid pressure in the space with a fluid pressure in the fluid passage of the ball, or both.

18. The method of claim 16, further comprising providing a contact force between the first seat surface and the ball which is lower than would occur without the fluid path.

19. The method of claim 16, further comprising equalizing a fluid pressure in the space with a fluid pressure in the fluid passage of the housing, equalizing a fluid pressure in the space with a fluid pressure in the fluid passage of the ball, or both.

20. The method of claim 16, wherein the wellbore tubular string comprises a plurality of the ball valves.

* * * * *